United States Patent
Saric et al.

(10) Patent No.: US 12,475,595 B2
(45) Date of Patent: Nov. 18, 2025

(54) NAVIGATION OF AN UNDERGROUND MINING MACHINE

(71) Applicant: COMMONWEALTH SCIENTIFIC AND INDUSTRIAL RESEARCH ORGANISATION, Australian Capital Territory (AU)

(72) Inventors: Kevin Saric, Australian Capital Territory (AU); Mark Dunn, Australian Capital Territory (AU); Peter Reid, Australian Capital Territory (AU); Jeremy Thompson, Australian Capital Territory (AU); John Malos, Australian Capital Territory (AU)

(73) Assignee: COMMONWEALTH SCIENTIFIC AND INDUSTRIAL RESEARCH ORGANISATION, Australian Capital Territory (AU)

(*) Notice: Subject to any disclaimer, the term of this patent is extended or adjusted under 35 U.S.C. 154(b) by 385 days.

(21) Appl. No.: 18/009,848

(22) PCT Filed: May 28, 2021

(86) PCT No.: PCT/AU2021/050528
§ 371 (c)(1),
(2) Date: Dec. 12, 2022

(87) PCT Pub. No.: WO2021/253068
PCT Pub. Date: Dec. 23, 2021

(65) Prior Publication Data
US 2023/0260153 A1    Aug. 17, 2023

(30) Foreign Application Priority Data
Jun. 18, 2020  (AU) .................................. 2020902027

(51) Int. Cl.
*G06T 7/73*    (2017.01)
*E21C 35/00*   (2006.01)
(Continued)

(52) U.S. Cl.
CPC .............. *G06T 7/74* (2017.01); *E21C 35/302* (2023.05); *G01S 17/08* (2013.01); *G01S 17/894* (2020.01);
(Continued)

(58) Field of Classification Search
CPC .... G06T 7/74; G06T 3/20; G06T 3/60; G06T 7/33; G06T 2207/10028; G06T 7/579;
(Continued)

(56) References Cited

U.S. PATENT DOCUMENTS

| | | | | |
|---|---|---|---|---|
| 6,608,913 B1 * | 8/2003 | Hinton | ................... | G01C 15/00 382/104 |
| 2013/0067831 A1 * | 3/2013 | Zimmerman | ......... | E04G 21/185 52/707 |

(Continued)

FOREIGN PATENT DOCUMENTS

| | | | |
|---|---|---|---|
| AU | 2016200789 B1 * | 12/2016 | ............. E21C 35/00 |
| CN | 105547288 A * | 5/2016 | |

(Continued)

OTHER PUBLICATIONS

International Search Report and Written Opinion prepared by the Australian Patent Office; 7 pgs.

*Primary Examiner* — Henok Shiferaw
*Assistant Examiner* — Woo C Rhim
(74) *Attorney, Agent, or Firm* — Kilpatrick Townsend & Stockton LLP

(57) ABSTRACT

This disclosure relates to navigation of an underground mining machine. A laser range finder captures first and second 3D point clouds of first and second overlapping parts (Continued)

of the underground mine from first and second positions of the mining machine respectively. A processor determines a first set of candidates for rock bolts as point feature objects from the first 3D point cloud; determines a second set of candidates for rock bolts as point feature objects from the second 3D point cloud; determines an alignment between first shapes defined by at least two of the first set of candidates for rock bolts and second shapes defined by at least two of the second set of candidates for rock bolts; and determines relative location information between the first position of the mining machine and the second position of the mining machine based on the alignment.

19 Claims, 4 Drawing Sheets

(51) Int. Cl.
*G01S 17/08* (2006.01)
*G01S 17/894* (2020.01)
*G05D 1/00* (2006.01)
*G06T 3/20* (2006.01)
*G06T 3/60* (2006.01)
*G06T 7/33* (2017.01)

(52) U.S. Cl.
CPC ............ *G05D 1/024* (2013.01); *G05D 1/0251* (2013.01); *G06T 3/20* (2013.01); *G06T 3/60* (2013.01); *G06T 7/33* (2017.01); *G06T 2207/10028* (2013.01)

(58) Field of Classification Search
CPC .. G06T 3/00; G06T 7/521; G06T 7/60; G06T 7/73; G01S 17/08; G01S 17/894; G01S 7/4817; G01S 17/931; G01S 7/4808; G05D 1/024; G05D 1/0251; G05D 1/0274; G05D 1/246; G05D 1/40; G05D 1/46; G01C 21/20; G01C 3/00; G01C 7/06; G01C 11/28; G01C 22/00; E21D 21/00; E21D 9/004; E21C 35/24; E02F 9/264; E02F 3/842; E02F 9/205; E21F 13/00
See application file for complete search history.

(56) References Cited

U.S. PATENT DOCUMENTS

| | | | |
|---|---|---|---|
| 2016/0333690 A1* | 11/2016 | Puura | G01C 7/06 |
| 2018/0158200 A1* | 6/2018 | Metzler | G01C 15/00 |
| 2020/0043186 A1* | 2/2020 | Selviah | G06T 7/33 |
| 2021/0256722 A1* | 8/2021 | Staab | G01S 17/894 |
| 2021/0323572 A1* | 10/2021 | He | G06T 3/14 |
| 2021/0334988 A1* | 10/2021 | Xiao | G06F 18/2193 |
| 2023/0260153 A1* | 8/2023 | Saric | E21D 9/004 382/103 |

FOREIGN PATENT DOCUMENTS

| | | | | |
|---|---|---|---|---|
| CN | 110178048 A | * | 8/2019 | G01S 13/87 |
| CN | 110658528 A | * | 1/2020 | |
| CN | 110849374 A | * | 2/2020 | G01C 21/20 |
| WO | WO-2015106799 A1 | * | 7/2015 | E21B 7/025 |
| WO | WO-2021159211 A1 | * | 8/2021 | E21D 20/00 |

* cited by examiner

NAVIGATION OF AN UNDERGROUND MINING MACHINE

TECHNICAL FIELD

This disclosure relates to systems and methods for navigation of an underground mining machine.

BACKGROUND

Navigation underground is associated with a range of problems, such as lack of satellite reception (such as Global Positioning System—GPS) as well as drift in inertial navigation sensors. Laser range finders provide point clouds that could be used for navigation. The problem is, however, that there is often significant noise in the point cloud measurements in underground operations and the surroundings are often relatively uniform (such as walls, roof, etc.) such that distinct features are typically not available but needed for many algorithms. For example, in a scene that is uniform and linear, such as a mining roadway, there are no large scale features to align and moving objects appear in and out of the scene, further disturbing the characteristics required to accurately align two point clouds. As a result it is often difficult to reliably register two point clouds or to extract three-dimensional features, such as corners or other 3D objects, for robust navigation.

Therefore, there is a need for a navigation solution that is more accurate and more robust to noise than existing solutions.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

This disclosure provides a navigation method that extracts, from two point clouds, stationary features that define potential locations of rock bolts. These features are represented by single, respective points instead of 3D objects. These point features are then used to define shapes, such as triangles, similar to constellations of stars. The change of location of these constellations between two point clouds is then used to determine the movement of the mining machine.

A method for navigation of an underground mining machine comprises:
  capturing a first 3D point cloud of a first part of the underground mine from a first position of the mining machine;
  determining a first set of candidates for rock bolts as point feature objects from the first 3D point cloud;
  capturing a second 3D point cloud of a second part of the underground mine from a second position of the mining machine, wherein the first part and the second part overlap;
  determining a second set of candidates for rock bolts as point feature objects from the second 3D point cloud;
  determining an alignment between first shapes defined by at least two of the first set of candidates for rock bolts and second shapes defined by at least two of the second set of candidates for rock bolts;
  determining relative location information between the first position of the mining machine and the second position of the mining machine based on the alignment.

It is an advantage that the candidates for rock bolts are determined as point feature objects and then used to align shapes formed by them. As a result, the method is robust to noise in the 3D point clouds and also computationally efficient.

Determining the alignment may comprise determining an alignment value representing a geometric transformation that maps the first shapes to the second shapes. The geometric transformation may comprise a rotation or a translation or both.

The first shapes and the second shapes may comprise triangles defined by three candidates for rock bolts.

The method may further comprise:
  creating the first shapes by selecting different combinations of at least two candidates for rock bolts from the first set of candidates for rock bolts; and
  creating the second shapes by selecting different combinations of at least two candidates for rock bolts from the second set of candidates for rock bolts.

The method may further comprise:
  creating the first shapes by selecting all combinations of at least two candidates for rock bolts from the first set of candidates for rock bolts;
  creating the second shapes by selecting all combinations of at least two candidates for rock bolts from the second set of candidates for rock bolts.

Each of the first set of candidates for rock bolts may define more than one of the first shapes; and each of the second set of candidates for rock bolts may define more than one of the second shapes.

The method may comprise determining multiple alignment values comprising an alignment value between each pair of one of the first shapes and one of the second shapes.

The method may comprise determining a histogram of the multiple alignment values; and determining the relative location information based on the histogram.

The method may comprise determining a statistical measure of the histogram; and in response to the statistical measure meeting a threshold, determining the relative location information based on a maximum value in the histogram.

The method may comprise iterating over pairs of shapes, the pairs of shapes comprising one of the first shapes and one of the second shapes; determining an alignment value for one of the pairs of shapes at each iteration; and terminating the iterating over pairs in response to the alignment value meeting a threshold value.

The method may further comprise determining the first set of candidates and the second set of candidates by detecting apex shapes in the respective point cloud, the apex shapes being created by laser light scattering on edges of a rock bolt.

The method may further comprise detecting apex shapes in a slice of the point cloud.

The method may further comprise projecting points in the slice of the 3D point cloud onto a plane in which the underground mining machine is located; and detecting the apex shapes in the projected points.

The method may further comprise accessing the projected points in order of distance from the underground mining machine.

Detecting the apex shape may comprise detecting a first flank facing towards the underground mining machine which is steeper than a second flank facing away from the mining machine.

The first flank may defines an angle from a wall or roof of the underground mine which is between 80 and 100 degrees.

Capturing the first 3D point cloud and the second 3D point cloud may comprise using a laser range finder that records a distance for multiple rotation angles.

Software, when executed by a computer, causes the computer to perform the above method.

A navigation system for an underground mining machine comprises:
- a laser range finder to
  - capture a first 3D point cloud of a first part of the underground mine from a first position of the mining machine, and
  - capture a second 3D point cloud of a second part of the underground mine from a second position of the mining machine, wherein the first part and the second part overlap; and
- a processor to
  - determine a first set of candidates for rock bolts as point feature objects from the first 3D point cloud;
  - determine a second set of candidates for rock bolts as point feature objects from the second 3D point cloud;
  - determine an alignment between first shapes defined by at least two of the first set of candidates for rock bolts and second shapes defined by at least two of the second set of candidates for rock bolts; and
  - determine relative location information between the first position of the mining machine and the second position of the mining machine based on the alignment.

BRIEF DESCRIPTION OF DRAWINGS

An example will now be described with reference to the following drawings.

DESCRIPTION OF EMBODIMENTS

Mining Machine

Figures 1, 2:
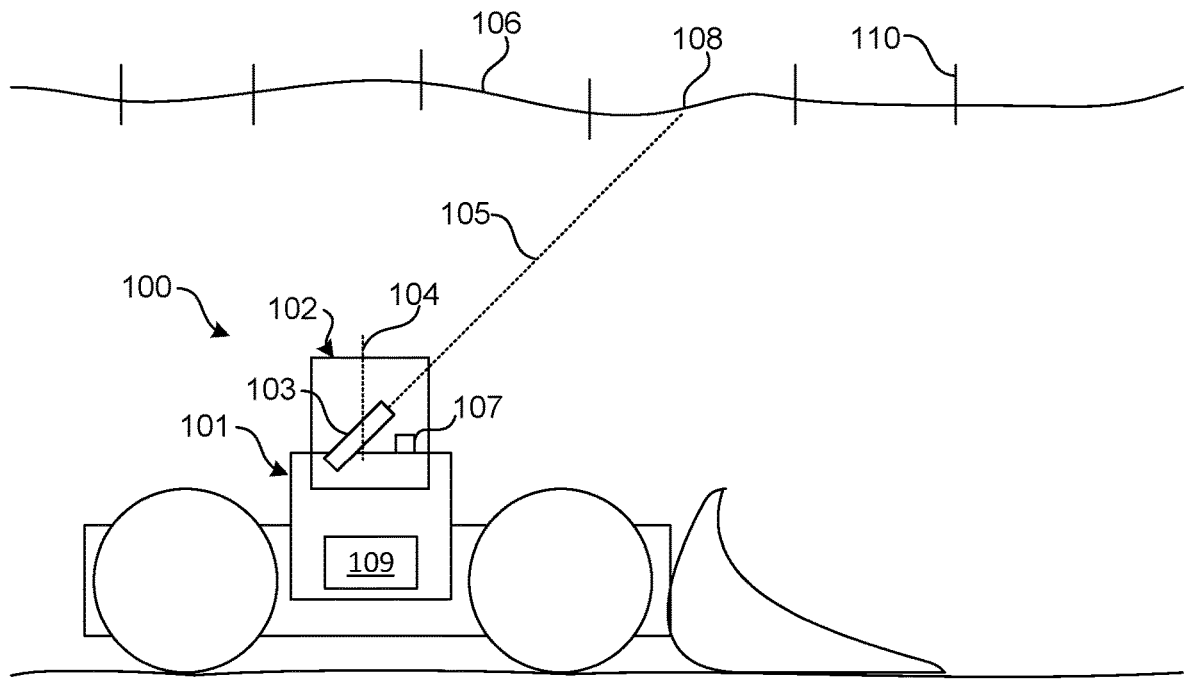
FIG. 1 illustrates an underground mining machine with a navigation system.
FIG. 2 illustrates a method for navigation of the underground mining machine of FIG. 1.

FIG. 1 illustrates an underground mining machine 100 with a navigation system 101. The navigation system 101 comprises a laser range finder 102 comprising a laser source 103 that is rotatable about rotation axis 104 according to an azimuth angle. There is a second rotation axis (not shown) to rotate the laser source in an up/down direction according to a zenith angle. Laser source 103 emits a laser beam 105, which is reflected off the roof 106 of the underground mine. A light detector 107 detects the reflected light. Laser range finder 102 measures a time difference, i.e. time of flight (TOF) between sending laser beam 105 and receiving the reflected light and calculates (based on the speed of light) a distance between the laser source 103 and a point 108 where the laser light is reflected off the roof 106.

Once the distance to point 108 is calculated and stored, range finder 102 rotates the laser source 103 by a set angle and repeats the measurement. This way, range finder 102 captures a large number of measurements. Each measurement is stored in association with the angle of the laser source. More particularly, range finder 102 stores a distance value, an azimuth value and a zenith value for each measurement. This representation can be referred to as a polar coordinate representation. Range finder 102 may also transform the measurements into a Cartesian coordinate system such that each measurement is stored as an (x,y,z) tuple, with the relative x, y and z offsets from the mining machine. Since the measurements are three-dimensional (polar or Cartesian), the set of measurements are referred to as 3D point cloud.

As the mining machine 100 moves, the range finder captures a first 3D point cloud from a first position of the mining machine. For example, the mining machine makes a move, stops and then scans the environment while stationary. This 3D point cloud captures the part of a mine that is 'in view' of the range finder, that is, the part that is not occluded by other structures. This part is referred to as the first part of the underground mine since the laser beam 105 does not reach other parts. After the mining machine 100 has travelled further (e.g., has made another move and stopped), range finder 102 captures a second 3D point cloud of a second part of the underground mine that is not 'in view' from a second position of the mining machine. The first part overlaps with the second part so that some features (e.g., some rock bolts) present in the first 3D point cloud are also present in the second 3D point cloud.

It is noted that in examples disclosed herein, it is assumed that the laser range finder 102 is in a fixed spatial relationship with the mining machine 100 as it is mounted on mining machine 100. Therefore, it is assumed that the location of the range finder 102 is identical to the location of the mining machine 100. This could also involve a known and constant offset between the location of the mining machine 100 and the location of the range finder 102. Further, the coordinate reference frame of the range finder 102 remains constant in relation to the mining machine 100. This means that the coordinate reference frame of the range finder 102 moves with the mining machine. As a result, point 108 on the mine roof will have a particular coordinate (polar or Cartesian) in the first 3D point cloud and a different coordinate in the second 3D point cloud because the mining machine 100 has moved. In some examples, the coordinates reference frames can be adjusted, such as by the pose of the mining machine 100 measured through inertial sensors for example, but this is not used in examples below. It is noted, however, that the navigation method disclosed herein can be combined with other methods, such as inertial dead reckoning to increase accuracy. One example would be the use of a Kalman filter to fuse two navigation methods.

Returning to FIG. 1, navigation system 101 further comprises a processor 109 to process the 3D point clouds generated by range finder 102 and to perform navigation. In particular, processor 109 aims to detect rock bolts (shown as straight vertical lines in FIG. 1), such as example roof bolt 110, from the point clouds and navigate by determining how constellations of roof bolts have changed between the first 3D point cloud and the second 3D point cloud. While examples herein relate to roof bolts, other rock bolts, such as wall bolts, can be used as point feature objects.

Navigation Method

FIG. 2 illustrates a method 200 for navigation of the underground mining machine 100 as performed by processor 109. As explained above, processor 109 captures a first 3D point cloud of a first part of the underground mine from a first position of the mining machine. This may comprise controlling the range finder 102 to capture a point cloud or to read the 3D point cloud data from memory filled by range finder 102.

Then, processor 109 determines 202 a first set of candidates for rock bolts as point feature objects from the first 3D point cloud. A detailed method for determining rock bolt candidates is provided below. It is noted here, however, that processor 109 determines 'candidates' which indicates that it is not necessary that the actual rock bolts are determined. Instead, processor 109 determines candidates (or estimates), which may include actual rock bolts but may also include a number of false positives, that is, detected rock bolts which are actually not rock bolts. Further, the candidate rock bolts may not include all rock bolts in the point cloud (false negatives).

It is further noted that the rock bolts are determined as point feature objects. This means that the only property of the candidate is its location as a 3D point. So the shape, orientation, surface, texture, size etc. of each rock bolt do not need to be determined. This is in contrast to other navigation methods where 3D features, such as corners or other objects are identified in the first point cloud and then matched against the same features in the second point cloud. Advantageously, the method disclosed herein has a higher tolerance against noise because only the point location of the rock bolts is used.

Proceeding with method 200, processor 109 captures 203 a second 3D point cloud of a second part of the underground mine from a second position of the mining machine. The first part and the second part overlap so that rock bolt candidates from the first 3D point cloud also appear in the second 3D point cloud.

So, processor 109 determines 204 a second set of candidates for rock bolts as point feature objects from the second 3D point cloud. Processor 109 then determines 205 an alignment between first shapes defined by at least two of the first set of candidates for rock bolts and second shapes defined by at least two of the second set of candidates for rock bolts. The determination of the alignment is explained in more detail below. Finally, processor 109 determines 206 relative location information between the first position of the mining machine 100 and the second position of the mining machine based on the alignment. For example, processor 109 determines a distance travelled by the mining machine 100 or a travel direction or both. If the absolute location of the rock bolts are known, processor 109 may also add the relative location information to the rock bolt location to determine an absolute location (such as in longitude, latitude and altitude).

Alignment Determination

As mentioned above, processor 109 determines an alignment of shapes of rock bolt candidates. In examples disclosed herein, shapes are triangles of three candidates. This enables the determination of rotation and translation (travel distance). In other examples, the shapes may be lines of two candidates for translation determination. The advantage would be computational efficiency. More complex shapes of more than three candidates and combinations of different shapes are equally possible but may result in a higher computational load.

Figure 3:
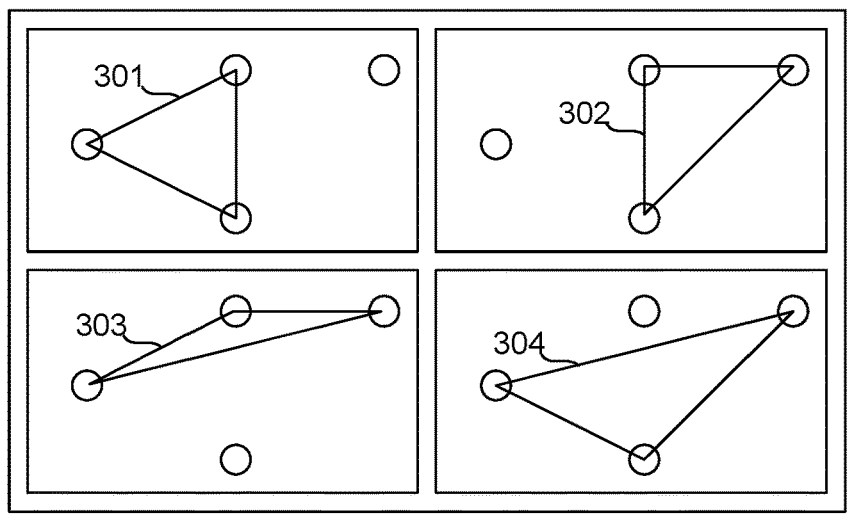
FIG. 3 illustrates different possible triangle shapes of candidate rock bolts for a first 3D point cloud.

FIG. 3 illustrates shapes of candidate rock bolts for the first 3D point cloud. In particular, FIG. 3 shows four identical copies of a plan view of the underground mine. Candidates for rock bolts are illustrated as circles and in this example, there are four candidates, which means there are four possible triangles (shapes) illustrated at 301, 302, 303, 304. The four triangles are shown in separate copies of the plan views for clarity. The shapes, triangles and lines may also be referred to as 'constellations'. In that sense, a constellation may be considered a collection of points representing the detected rock bolts, along with the characteristic signature of geometries, such as distances and directions, between them. Shapes do not need to be closed shapes and do not need to enclose a surface. So shapes may also be crosses defined by four peripheral point and one central point. In general, a shape is defined by any set of two or more points (i.e. point features representing rock bolt candidates).

Processor 109 may store all candidates as records in a database table (or on memory, disk, RAM, etc.) with corresponding 3D coordinates and candidate identifier. For example, these coordinates may be the result of projecting the 3D coordinates onto a plane of the mine roof. As a result, the shapes are then two-dimensional. In other examples, processor 109 processes the candidates in three dimensions with the 3D coordinates of the tips of the bolts. Processor 109 may then store the triangles 301, 302, 303, 304 in a separate table with three candidate identifiers for each record. So at the end of creating the shapes for the first 3D point cloud, there are four records in this example.

Figure 4:
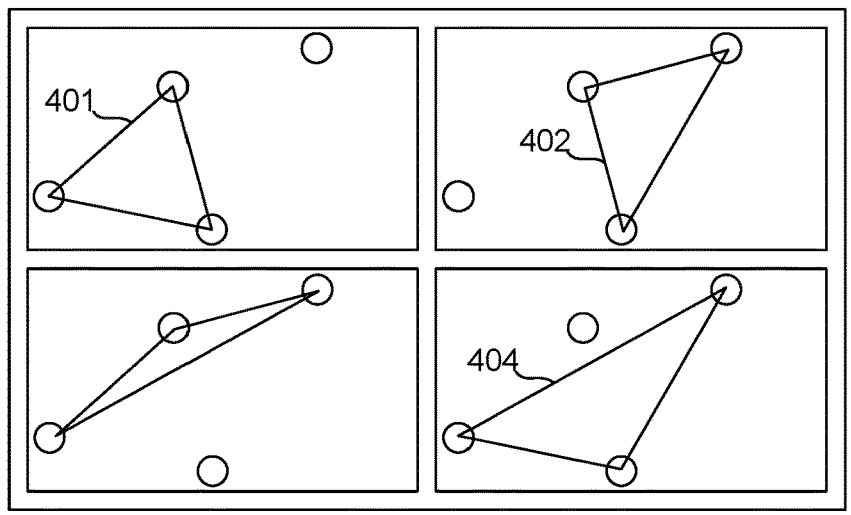
FIG. 4 illustrates different possible triangle shapes of candidate rock bolts for a second 3D point cloud.

FIG. 4 illustrates shapes of candidate rock bolts for the second 3D point cloud. For simplicity, the same number of candidates are present as in FIG. 3, which is not necessary. As a result, there are also four triangles 401, 402, 403, 404.

Processor 109 now determines an alignment between the shapes in FIG. 3 and the shapes in FIG. 4 as described below.

Figure 5:
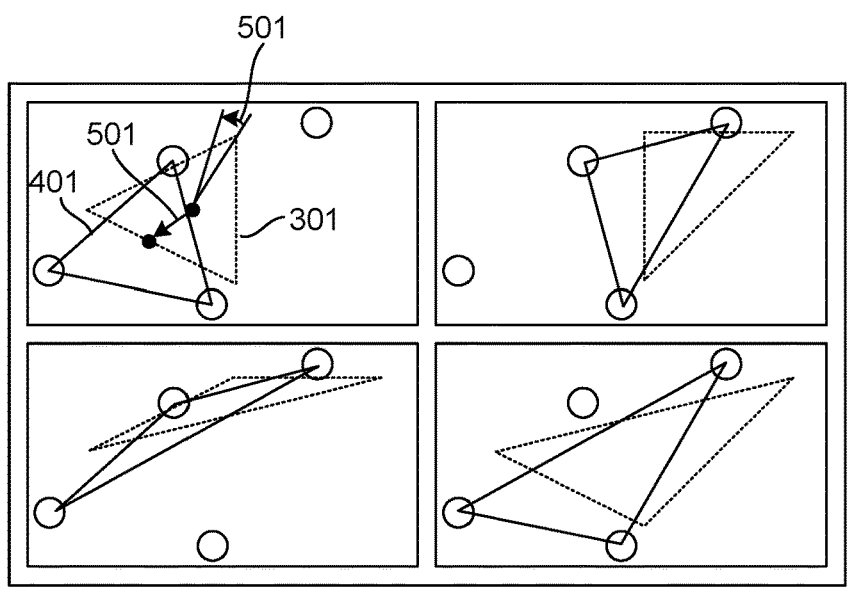
FIG. 5 illustrates an alignment between corresponding triangle shapes.

FIG. 5 illustrates an alignment between corresponding triangles. In particular, FIG. 5 shows triangle 401 from the second point cloud and triangle 301 from the first point cloud overlaid in dashed outline. Processor 109 now aims to align the two triangles. To this end, processor 109 considers the centre points of both triangles illustrated as black dots and calculates a translation 501 to bring the centre point of triangle onto the centre point of triangle 301 or vice versa, to thereby align the two triangles. In one example, the rotation is two-dimensional especially where the points are projected onto the 2D mine roof plane. The centre point may be defined as the orthocentre (intersection of the altitudes), centroid (intersection of the medians), circumcentre, centre of the incircle, centre of the nine-point circle, or others, such as a point ⅓ of the way down from the narrowest side of the triangle.

Processor 109 also calculates a rotation 502 to align the two triangles. For example, processor 109 compares the angles or sides (functionally equivalent options) of the triangles and then calculates a rotation to bring the matching angles into alignment. This may be a two- or three-dimensional rotation.

In one example, processor 109 has available a general trajectory of the mining machine 100. For example, a piece of equipment may travel along a roadway rather than turn 90 degrees and drive into a wall. Using this information processor 109 can discard triangle matches that contradict the general trajectory.

Processor 109 then repeats those calculation for the remaining triangles 302, 303, 304 to align them with triangles 402, 403, 404, respectively. Once the translation and the rotation are known, processor 109 can use this to calculate an update position and pose of the mining machine 100.

While FIG. 5 illustrates how to determine an alignment, there is an assumption in FIG. 5 that the correspondence between triangles 301 and 401 is known. In most cases, however, processor 109 does not have this information and does therefore not know which triangle to align with which other triangle. Therefore, a consensus method will now be described.

Consensus Method

In the proposed consensus method, processor 109 determines an alignment for all pairs of triangles. Each pair comprises one triangle from the first point cloud and one triangle from the second point cloud. There is a list of triangles for each point cloud and processor 109 may iterate over one of the lists, such as the shorter list or the longer list. For each triangle from the chosen list, processor 109 determines an alignment with every triangle from the other list. In one example, processor 109 stores the translation and rotation for all triangle pairs. In other examples, the processor 109 determines whether the triangles match and only then store the translation and rotation of that pair. If the triangles are too different, processor 109 discards that pair. For example, if their sides or angles differ by less than 10% different, processor 109 consider them as matches. But if the triangles differ by more than 10%, they are discarded. Other percentage values or measures for matching triangles can equally be used.

Once a list of translations and rotations is available, processor 109 can analyse whether there is a consensus on which translation and rotation is the most likely one. For example, processor 109 finds the most common values for translation and rotation within the list. Since there is noise in the system, the values may not match exactly, so processor 109 aims to find the most common range of values. In one example, processor 109 performs a statistical consensus method as described below, but other consensus methods can be used.

Statistical Consensus Method

Figure 6:
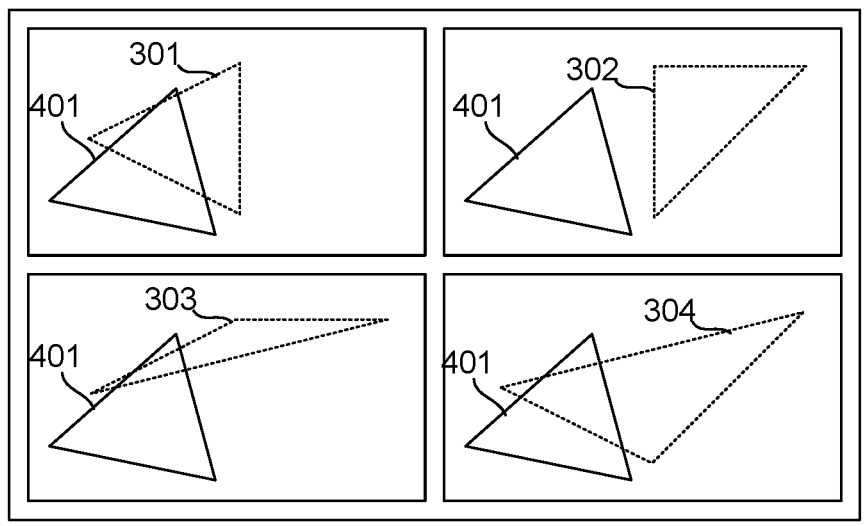
FIG. 6 illustrates an example of statistical consensus.

FIG. 6 illustrates an example of statistical consensus where processor 109 determines an alignment between triangle 401 from the second point cloud to all triangles 301, 302, 303, 304 from the first point cloud. For each triangle 301, 302, 303, 304 processor 109 calculates a translation and rotation as a geometric transformation to map those triangles to triangle 401. It is noted that the mapping may not be exact but may be the result of a minimisation of the error between locations of the corners of the triangles.

Figure 7:
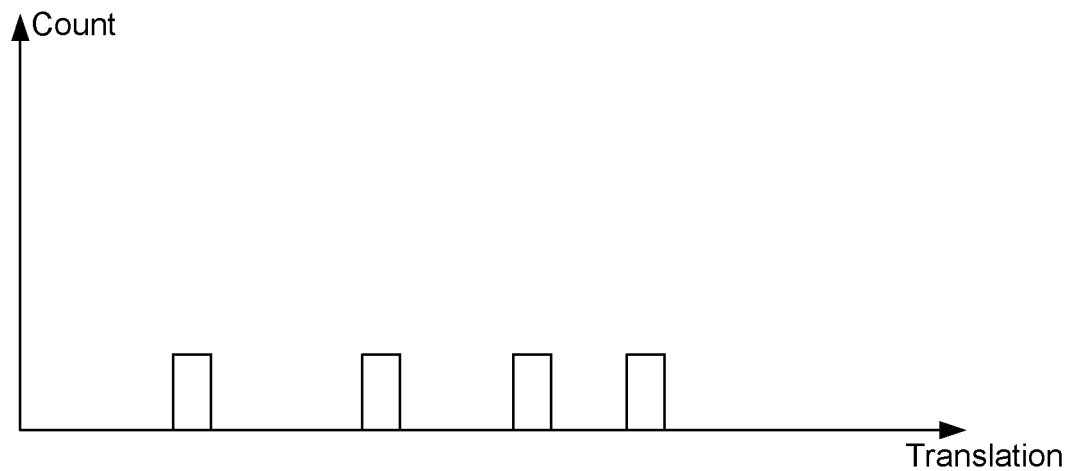
FIG. 7 is a histogram with four rotation values.

Processor 109 then includes the four translation values into a histogram as shown in FIG. 7. The histogram shows translation into one direction (e.g., x-direction) noting that similar histograms are created for the other directions (y- and z-direction). Creating the histograms comprises binning translations and rotations. The bins may be a set number of ranges that are distributed equally between extreme values. The extreme values may be those that are realistic under a known environment. For example, it is known that the mining machine can move no more than 10 m between capturing the point clouds, so the extreme values relate to a machine movement of 0 m and 10 m. Equally, the rotation can be limited to lie between −45 deg and 45 deg. The number of bins may depend on the desired resolution and the number of triangle pairs and may be 100 or 500 or a $1/100^{th}$ of the number of triangle pairs.

In the example of FIG. 7, there are four different translations and none of those stand out as the most likely or more significant translation. However, processor 109 now repeats this alignment for all triangles from the second point cloud 402, 403 and 404. In total, there are ten pairs of triangles and for each triangle from the second point cloud, the translation will be the same if it is mapped to the corresponding triangle in the first point cloud. In other words, there are four pairs, which should have an identical translation since for those four pairs, the movement of the mining machine is identical and therefore the translation should be the same. For pairs with non-corresponding triangles, the translation values should vary over a wider range.

Figure 8:
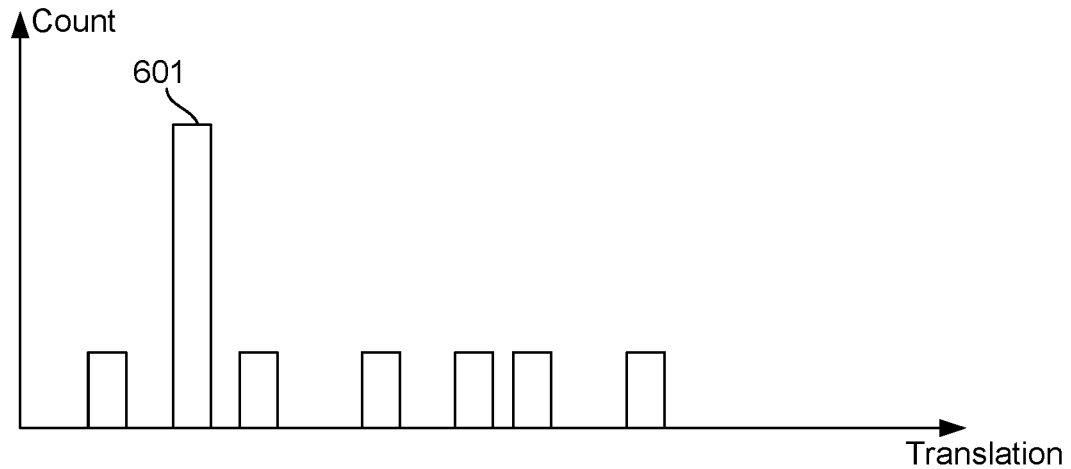
FIG. 8 is a histogram with ten rotation values.

FIG. 8 illustrates another histogram, which now includes the translation values of all possible pairs of triangles. Clearly, there is a peak of four at 601, which represents the translations of the four pairs of corresponding triangles. The remaining translation values are distributed across the range of rotations.

In this simple example, processor 109 can use the maximum of the histogram in FIG. 8 as the actual translation value. However, for point clouds with more noise and a larger number of candidates and a larger number of false positives, the maximum may not as clear. Further, the number of possible combinations can be large so it would be useful to stop the alignment process as soon as a sufficient reliability is achieved.

For this purpose, processor 109 calculates statistical measures, such as kurtosis and standard deviation. Processor 109 may then fuse the standard deviation and kurtosis, such as by adding them or calculating a weighted sum. In other words, the standard deviation of the matches provides a probability of the consensus being accurate based on the bin counts. For example, if all the matches give the same result, then the standard deviation will be low. In practice this is unlikely due to false positives. Kurtosis provides a similar gauge of uniformity of results, but represents the height of the tallest histogram bin relative to the other bins. These two values are fused together to create a confidence value that the results show as consensus.

Processor 109 can then compare the result against a threshold (such as 50%) to determine if a consensus is reached. For example, processor 109 takes the kurtosis and standard deviation of the histogram and other factors and weight them according to a predetermined measure of how "good" the results are, trying to make the confidence value equal 100% when the results are perfect, 50% when they are uncertain, and 0% when it fails entirely. The values of standard deviation and kurtosis are thus tuneable. For example, processor 109 scales the standard deviation to a max of 6 sigma (~99.7%), and the kurtosis to a value of 25. These two confidence calculations are fused 50/50, which means processor 109 calculates the sum of the scaled standard deviation and the scaled kurtosis. It's worth noting these values can be tuned based on situation, mine/equipment conditions, risk threshold, etc.

As soon as the result is above a set threshold, processor 109 stops the alignment process. That is, processor 109 stops determining the alignment between triangles and outputs the calculated translation and rotation. This can significantly reduce computation time as processor 109 iterates over the pairs of triangles but does not need to calculate all triangles.

Instead, processor 109 terminates the alignment determination once the termination condition is met, such as when the fused kurtosis and standard deviation cross the threshold.

The output created by processor 109 may be a transformation matrix which contains the translation and rotation between the two clouds, where a consensus was formed.

Candidate Determination

As set out above, processor 109 determines a set of candidates for rock bolts as point feature objects from each of the 3D clouds. The following description provides further detail on how to determine the candidates.

Figure 9:
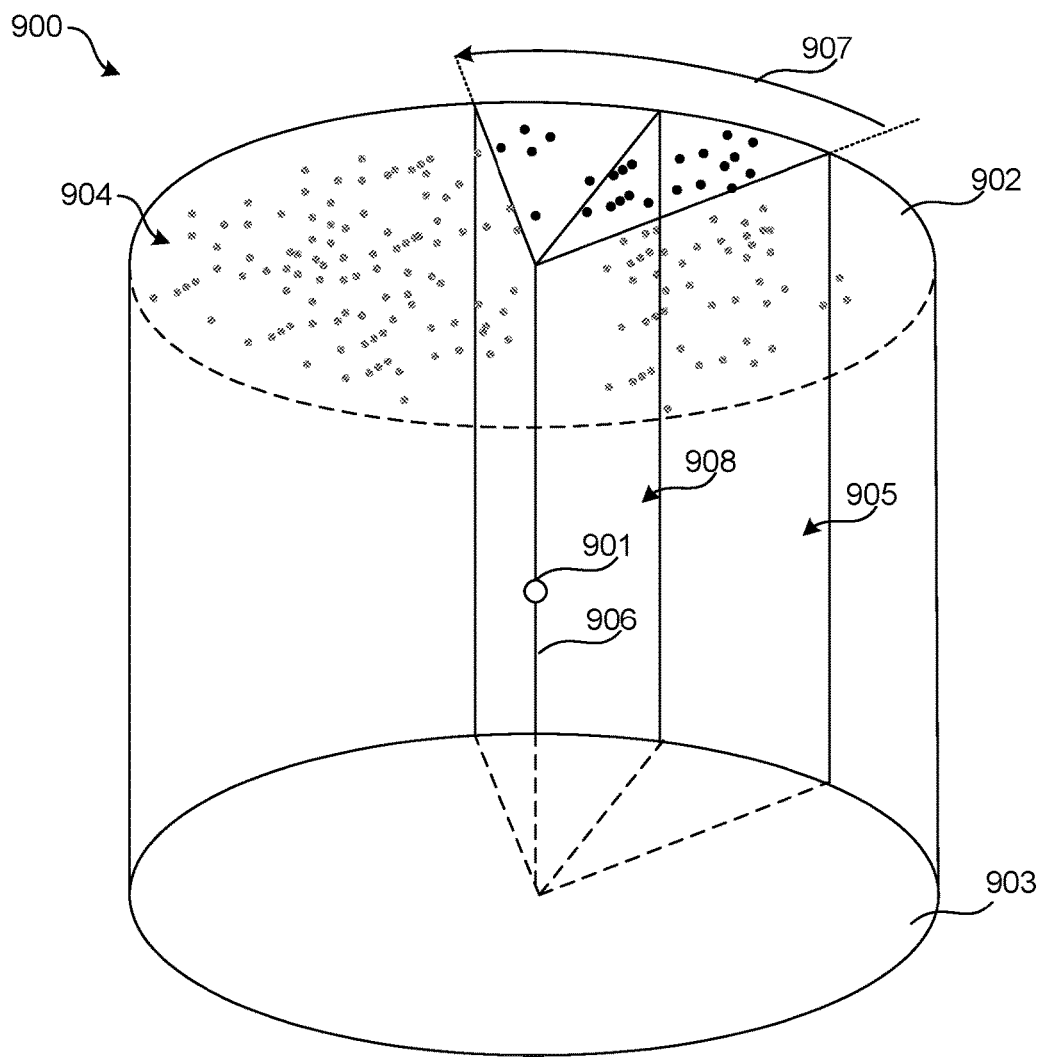
FIG. 9 illustrates a 3D point cloud in a polar coordinate system.

FIG. 9 illustrates a polar coordinate system 900 with the current location 901 of the mining machine at its centre. In this example, the polar coordinate system 900 is shown as a cylinder to illustrate that there is a roof 902 and floor 903 of the underground mine. The view in FIG. 9 is from the bottom up so that the roof 902 is in view since the rock bolts are installed in the roof 902. FIG. 9 also shows a 3D point cloud 904, which is spread across mine roof 902 and illustrated as dots, where each dot represents one distance measurement from location 901.

FIG. 9 also shows a slice 905, which is defined by a vertical axis 906 and an opening angle 907. The opening angle 907 enables processor 109 to select all measurements that are within the slice by selecting those measurements with a rotation angle within the opening angle 907. In FIG. 9, the selected points within slice 905 are shown in solid black while the unselected points are shown with a shaded area. It is noted that the vertical limits defined by the mine roof 902 and the mine floor 903 are only shown for illustrative purposes and processor 109 does not need to take them into account to select points in a slice. The opening angle 907 is wide enough so that a large number of points is selected, but also narrow enough to provide a good spatial resolution. In one example, the opening angle is 1 degree or 0.1 degree. In other examples, the opening angle depends on the total number of points and is selected such that a minimum number of points is within the slice, such as at least 100 points or at least 1,000 points.

Once the points within the slice are selected, processor 109 projects the selected points onto a plane 908. In this example, plane 908 bisects the slice (is within the slice at half the opening angle) and includes the vertical axis 906 but the plane could equally be at other angles. The projection may be achieved by simply discarding the azimuth angle for the selected points, which results in a two-dimensional representation comprising a zenith angle value and a distance value for each point selected from the point cloud. This representation is also referred to as a 'profile'.

Figure 10:
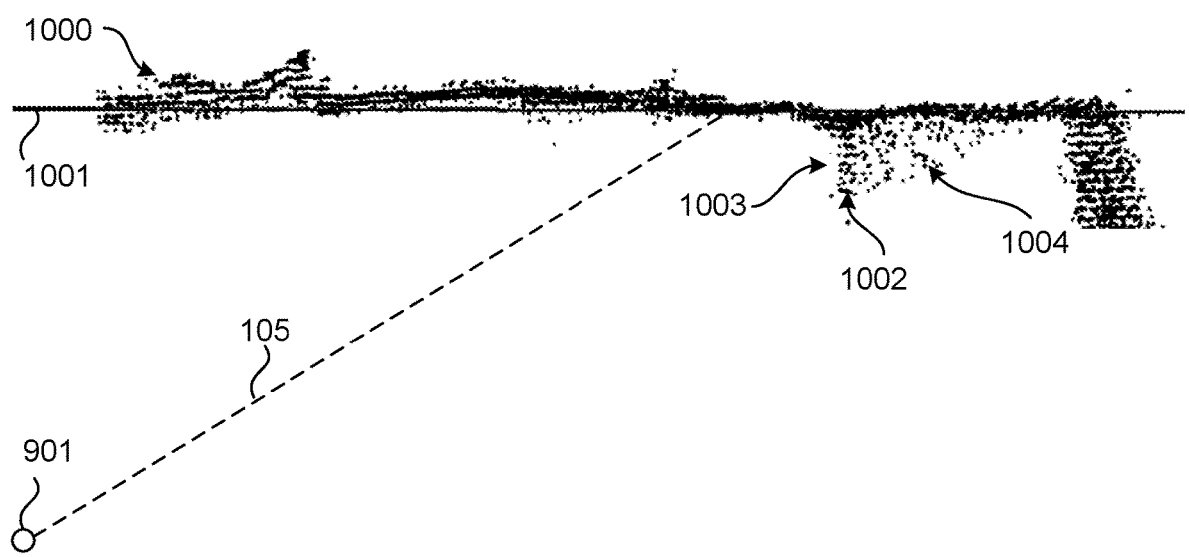
FIG. 10 illustrates an example profile of a slice of the point cloud of FIG. 9.

FIG. 10 illustrates an example profile 1000. For clarity, FIG. 10 also shows the location of the mining machine 901 and symbolically the laser beam 105 from the range finder. For illustrative purposes, FIG. 10 also shows the roof line 1001, which the processor 109 may determine but which is not necessary to the disclosed method.

Within profile 1000, there is an apex 1002 which can indicate the location of a roof bolt, noting that 'apex' is used here for clarity although it could be seen as the 'lowest' point in the profile. In that sense, apex 1002 indicates the location of a roof bolt candidate. Apex 1002 appears in profile because of scattering of laser light from a roof bolt. More particularly, the light emission pattern of a laser is shaped like a rectangle, rather than an infinitesimally-small point. As the rectangular pattern of light sweeps across rock bolts, the light splatters off the edges of the bolt and creates an artefact that is referred to as an "inverted shark fin". This inverted shark fin creates a small area of false information in the point cloud. This false information does not represent the geometric reality of the scene. Often this is problematic enough that efforts are made to remove these artefacts. However in the approach disclosed herein, this artefact is exploited usefully.

Stitching point clouds depends heavily on separating moving and stationary objects since the moving objects are distractions as they do not represent the fixed world view. While the bolts themselves are stationary, the lighting/LIDAR artifacts move, rotating around the bolts, mirroring the movements of the sensor itself. The approach disclose herein uses these moving "false" components (the light splatter artefacts) to identify the "true" stationary object (the bolt tip).

Further, laser beams that do not hit the roof bolt directly at the front, but slightly off-centre, are reflected into different directions, which results in a range of different distances measured by the range finder 102. Due to the projection of the selected points in the slice 905, these different distances then appear together in the profile 1000 in an 'accumulated' way. The direct reflections off the rock bolt have a small spread in distance, and therefore the front edge of the rock bolt is relatively sharp, resulting in a relatively steep and dense front flank 1003 in profile 1000. In contrast, the scattered measurements are spread over a wider distance range, resulting in a relatively less steep and sparser rear flank 1004. The resulting shape can also be described as a 'shark fin' due to its characteristic shape. So essentially, processor 109 performs a shark fin detection.

More particularly, processor 109 uses these characteristics of apex 1002 to identify its position. For example, processor 109 iterates over all points of profile 1000 in the order of the measured distance, or in the order of the zenith angle provided by the range finder 104. Processor 109 then determines whether there is a relatively steep flank, such as by performing an edge detection algorithm or by calculating a moving average of the zenith or height difference of subsequent points. If the moving average is above a threshold, such as 70 degrees, processor 109 considers that location as a steep flank. At the end of the steep flank, processor 109 then applies a similar method to find a less steep flank (with an opposite slope). In other examples, processor 109 detects two adjacent flanks and determines whether the leading flank 1003 is steeper than the trailing flank 1004 (and in an opposite direction). In other words, the trailing flank has a distinct trigonometric character, with its angle being predictable relative to the laser position. This angle gives a strong indication if a protrusion (i.e. apex) is a bolt or not.

Once these conditions are met, processor 109 records the 3D location of the apex 1002 as a candidate for a rock bolt, which creates one of the points in FIGS. 3-5. Processor 109 may take the location of the leading flank 1003 of the trailing flank 1004 or an average of all points (centre of gravity) within the flanks as the actual point of the candidate of the rock bolt. It is noted here again, that once the location is determined, processor 109 does not consider the shape of apex 1002 any further but treats the candidate as a single point. This point may be reference by x, y and z coordinates or by azimuth and distance values. In examples where the apex location is projected onto projecting plane 908, the azimuth value of apex 1002 (i.e., of the rock bolt candidate) can be replaced by the azimuth angle of the projecting plane 908.

Processor 109 then proceed with further points in profile 1000 to detect further apexes and then continues with further slices from the point cloud.

Processing Time

It is noted that the determination of the candidates for rock bolts is computationally very efficient in the sense that it provides a solution that other approaches can only provide with more computational complexity. In particular, projecting selected points onto plane 908 may not require any calculation at all if the azimuth angles are ignored, but only a selection operation. Further, the iteration over all points of the profile 1000 is also efficient. Therefore, it is possible to determine all candidates within a fraction of a second or up to a few seconds depending on the scan. Further, the determination of alignment between possible triangle combinations is also efficient in the sense that it can be stopped when a sufficient confidence has been achieved. As a result, the computation time for the statistical alignment depends on the number of range finder measurements in the 3D point cloud, the noise, the number of false positives and the number of visible rock bolts. It is possible, however, to complete the candidate detection and alignment while the mining machine 100 is stationary between moves, such as at a few meters per hour. As a result, the region captured by the first point cloud overlaps with the region of the second point cloud. Further, navigation using the proposed method is more accurate than using inertial navigation alone. Even further, the location of the rock bolts is absolute and does not change, which means the determined relative location information, such as travel distance, direction and change in pose is highly accurate and can be used to calibrate navigation systems with an inherent drift error, such as inertial navigation systems.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for navigation of an underground mining machine, the method comprising:
    capturing a first 3D point cloud of a first part of an underground mine from a first position of the mining machine;
    determining a first set of candidates for rock bolts as point feature objects from the first 3D point cloud by detecting first apex shapes in the first 3D point cloud, the first apex shapes being created by laser light scattering on edges of the rock bolts;
    capturing a second 3D point cloud of a second part of the underground mine from a second position of the mining machine, wherein the first part and the second part overlap;
    determining a second set of candidates for rock bolts as point feature objects from the second 3D point cloud by detecting second apex shapes in the second 3D point cloud, the second apex shapes being created by the laser light scattering on the edges of the rock bolts;
    determining an alignment between first shapes defined by at least two of the first set of candidates for rock bolts and second shapes defined by at least two of the second set of candidates for rock bolts;
    determining relative location information between the first position of the mining machine and the second position of the mining machine based on the alignment.

2. The method of claim 1, wherein determining the alignment comprises determining an alignment value representing a geometric transformation that maps the first shapes to the second shapes.

3. The method of claim 2, wherein the geometric transformation comprises a rotation or a translation or both.

4. The method of claim 1, wherein the first shapes and the second shapes comprise triangles defined by three candidates for rock bolts.

5. The method of claim 1, wherein the method comprises:
    creating the first shapes by selecting different combinations of at least two candidates for rock bolts from the first set of candidates for rock bolts; and
    creating the second shapes by selecting different combinations of at least two candidates for rock bolts from the second set of candidates for rock bolts.

6. The method of claim 5, wherein the method comprises:
    creating the first shapes by selecting all combinations of at least two candidates for rock bolts from the first set of candidates for rock bolts;
    creating the second shapes by selecting all combinations of at least two candidates for rock bolts from the second set of candidates for rock bolts.

7. The method of claim 1, wherein
    each of the first set of candidates for rock bolts defines more than one of the first shapes; and
    each of the second set of candidates for rock bolts defines more than one of the second shapes.

8. The method of claim 1, wherein the method comprises determining multiple alignment values comprising an alignment value between each pair of one of the first shapes and one of the second shapes.

9. The method of claim 8, wherein the method comprises:
    determining a histogram of the multiple alignment values; and
    determining the relative location information based on the histogram.

10. The method of claim 9, wherein the method comprises:
    determining a statistical measure of the histogram;
    in response to the statistical measure meeting a threshold, determining the relative location information based on a maximum value in the histogram.

11. The method of claim 1, wherein the method comprises:
    iterating over pairs of shapes, the pairs of shapes comprising one of the first shapes and one of the second shapes;
    determining an alignment value for one of the pairs of shapes at each iteration; and
    terminating the iterating over pairs in response to the alignment value meeting a threshold value.

12. The method of claim 1, wherein the method comprises detecting apex shapes in a slice of the point cloud.

13. The method of claim 12, wherein the method comprises:
    projecting points in the slice of the 3D point cloud onto a plane in which the underground mining machine is located; and
    detecting the apex shapes in the projected points.

14. The method of claim 13, wherein the method further comprises accessing the projected points in order of distance from the underground mining machine.

15. The method of claim 1, wherein detecting the apex shape comprises detecting a first flank facing towards the underground mining machine which is steeper than a second flank facing away from the mining machine.

16. The method of claim 15, wherein the first flank defines an angle from a wall or roof of the underground mine which is between 80 and 100 degrees.

17. The method of claim 1, wherein capturing the first 3D point cloud and the second 3D point cloud comprises using a laser range finder that records a distance for multiple rotation angles.

18. A non-transitory computer-readable medium with program code stored thereon that, when executed by a computer, causes the computer to perform the steps of:
   capturing a first 3D point cloud of a first part of an underground mine from a first position of the mining machine;
   determining a first set of candidates for rock bolts as point feature objects from the first 3D point cloud by detecting first apex shapes in the first 3D point cloud, the first apex shapes being created by laser light scattering on edges of the rock bolts;
   capturing a second 3D point cloud of a second part of the underground mine from a second position of the mining machine, wherein the first part and the second part overlap;
   determining a second set of candidates for rock bolts as point feature objects from the second 3D point cloud by detecting second apex shapes in the second 3D point cloud, the second apex shapes being created by the laser light scattering on the edges of the rock bolts;
   determining an alignment between first shapes defined by at least two of the first set of candidates for rock bolts and second shapes defined by at least two of the second set of candidates for rock bolts;
   determining relative location information between the first position of the mining machine and the second position of the mining machine based on the alignment.

19. A navigation system for an underground mining machine, the navigation system comprising:
   a laser range finder to
      capture a first 3D point cloud of a first part of an underground mine from a first position of the mining machine, and
      capture a second 3D point cloud of a second part of the underground mine from a second position of the mining machine, wherein the first part and the second part overlap; and
   a processor to
      determine a first set of candidates for rock bolts as point feature objects from the first 3D point cloud by detecting first apex shapes in the first 3D point cloud, the first apex shapes being created by laser light scattering on edges of the rock bolts;
      determine a second set of candidates for rock bolts as point feature objects from the second 3D point cloud by detecting second apex shapes in the second 3D point cloud, the second apex shapes being created by the laser light scattering on the edges of the rock bolts;
      determine an alignment between first shapes defined by at least two of the first set of candidates for rock bolts and second shapes defined by at least two of the second set of candidates for rock bolts; and
      determine relative location information between the first position of the mining machine and the second position of the mining machine based on the alignment.

* * * * *